Oct. 20, 1931. W. E. TRENT Re. 18,234
PROCESS OF CRACKING COAL AND OIL
Original Filed Sept. 27, 1924
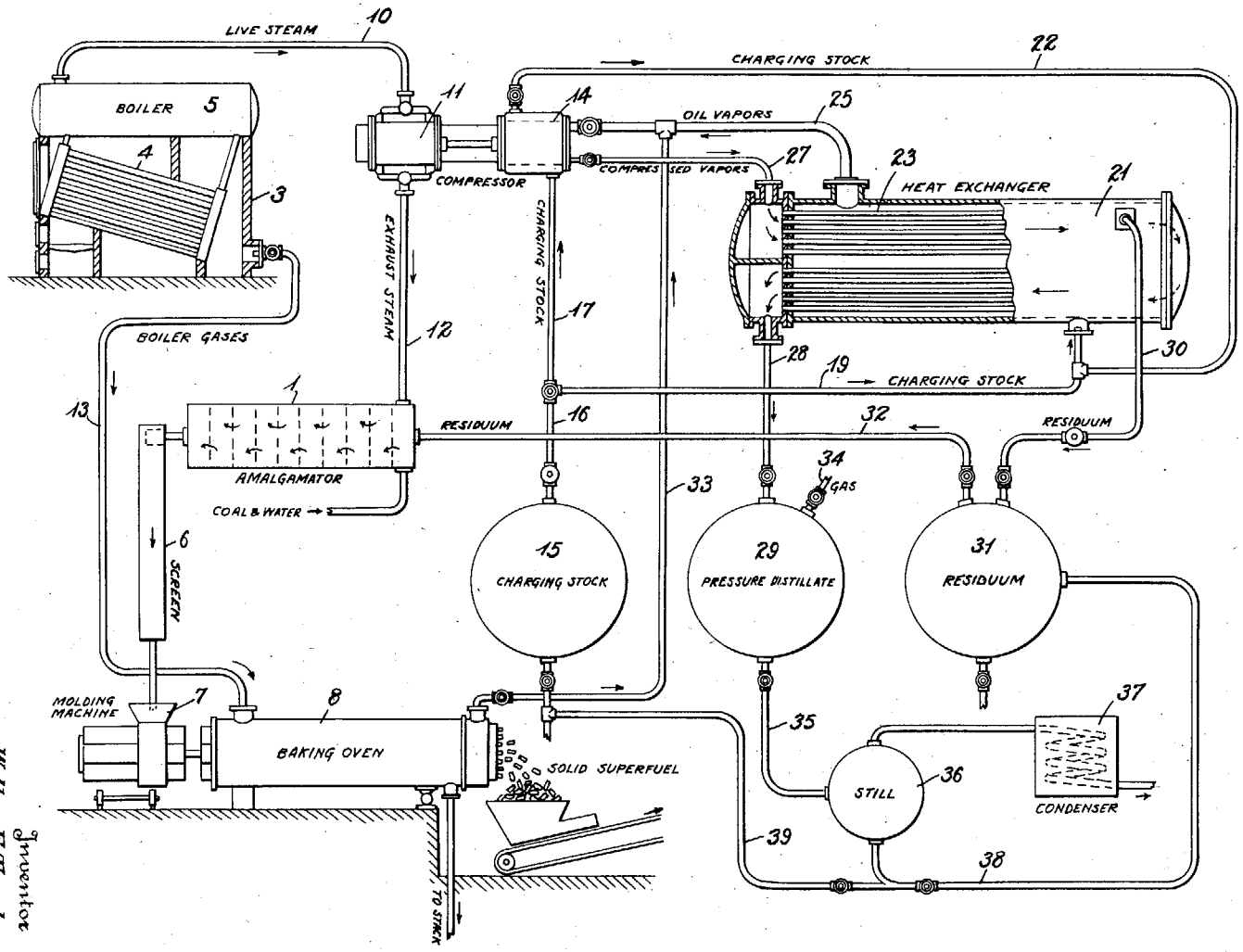
Inventor
Walter E. Trent
By Charles M. Thomas
Attorney Reissued Oct. 20, 1931

Re. 18,234

UNITED STATES PATENT OFFICE

WALTER EDWIN TRENT, OF NEW YORK, N. Y., ASSIGNOR TO TRENT PROCESS CORPORATION, OF NEW YORK, N. Y., A CORPORATION OF DELAWARE

PROCESS OF CRACKING COAL AND OIL

Original No. 1,589,023, dated June 15, 1926, Serial No. 740,385, filed September 27, 1924. Application for reissue filed November 7, 1927. Serial No. 231,758.

The invention relates to improvements in processes for the production of purified solid fuels in conjunction with the production of liquid motor fuels.

The purified solid fuel is made by amalgamating finely pulverized coal with an oil residuum obtained by first evaporating the lighter boiling fractions from a crude or fuel oil.

The heat for evaporating these lighter fractions is generated by the compression of the evaporated vapors and then imparting this heat to the crude oil or other charging stock through the medium of a heat exchanger.

It is necessary to use a residuum with a high percentage of asphalt or carbon so that the resulting amalgam of the coal particles and residuum, when baked or carbonized, will provide the binder for making hard, strong fuel masses.

It is not the intention to use a residuum that will make hard and strong fuel masses in a green state by merely briquetting or shaping and then cooling. They are only to be so after baking and carbonizing and the residuum is to be such that from about 40 to 80% of same will vaporize under the baking or carbonizing treatment. These vaporized fractions are conducted to and mixed with the evaporated fractions derived from the original charging stock that enters the heat exchanger and simultaneously compressed, then cooled and liquefied by circulating through the heat exchanger in tubes surrounded by the oil to be evaporated.

The positive displacement compression of these vapors is to develop the combination of pressure and temperature that causes the maximum degree of cracking of the vapors into lighter boiling fractions and the heat of compression so generated is to be transferred to and cause the vaporization of the more volatile fractions of fresh portions of crude or other charging stock. The compressed vapors constitute, when cracked and condensed, a pressure distillate from which is to be extracted and refined the desired fractions of liquid motor fuel by any of the existing methods, and the remaining fractions are to be added either continuously or intermittently to the residuum from the heat exchanger or to the original charging stock to undergo the treatment cycle a second time simultaneously with the rest of the operation.

The invention particularly relates to a process broadly described in my Patents Nos. 1,420,164 and 1,420,165 relating to the purification of coals by amalgamation with oils obtained by the distillation of the product, and aims to carry out the operation with the greatest possible heat efficiency and economy and further to produce definite quality forms of both solid and liquid fuels.

The heat utilization is practiced by using;—

A boiler and steam actuated compressor, the pressure steam to actuate the oil vapor compressor, the exhaust steam from the compressor to be utilized to heat the water used in the amalgamator box. The boiler stack gases are used to heat the amalgam baking apparatus. The heat generated by oil vapor compression is to be utilized to vaporize the original charging stock oil; the heat in the vaporized oil fractions leaving the baking apparatus is utilized in bringing the same while in vapor form to cracking pressure and temperature, and the sensible heat of the oil residuum is utilized in making amalgam.

An alternative operation, without departing from the medium embodying efficient heat utilization, is to use an internal combustion engine as the prime mover, instead of a boiler and steam driven vapor compressor, to operate the oil vapor compressor. The waste jacket heat of the engine, which is about 50% of the total original heat of the fuel oil, will be utilized to heat both the amalgamating water and the original charging stock oil divided as to give the highest efficiency. The exhaust gases of the engine will be utilized to heat the baking oven.

In the drawings I have shown diagrammatically an apparatus for supporting this process.

Referring now more particularly to the drawings wherein like reference characters indicate corresponding parts, the numeral 1 designates an amalgamator in which finely pulverized coal of say 100 meshes to the linear inch is introduced, preferably in water suspension, through the feeding line. This amalgamator contains a series of agitators for thoroughly agitating the material therein. To this amalgamator I also introduce liquid hydrocarbon residuum oils, which oils are delivered hot after having had the lighter fractions removed by evaporation.

Exhaust steam is introduced to this amalgamator which was first generated in a boiler plant 3 having the boiler tubes 4 and a boiler 5 therein, and then expanded in oil vapor compressor. The boiler is fired in any well known manner, the steam being introduced to the amalgamator in a way to be hereinafter described.

The material undergoing amalgamation in the amalgamator is such as described in my patents aforesaid, and when discharged from the amalgamator consists of a plastic mixture of coal and oil of a consistency resembling putty, usually in the form of spherical bodies of desired diameters. These bodies, or masses, are largely free of water and detached ash. They are deposited on the screen 6 so to be separated from water and ash, and this screen carries them to a hopper 7, there to be formed or moulded into desired shapes and conveyed through an elongated baking oven 8, which is heated by stack gases from the steam boiler. The purpose for baking or carbonizing the formed fuel masses is to make them hard and strong so they may be transported and handled, to make them smokeless under combustion, or substantially so, and to remove the oils vaporized at the temperatures employed so that they may be treated to convert them into light boiling motor fuel fractions.

Adverting now to the steam boiler, it will be seen that the steam from this boiler discharges through a line 10 to a compressor cylinder 11, being exhausted from this cylinder through a line 12 into the amalgamator 1. Hot boiler gases from the boiler also discharge through the line 13 into the baking oven 8 to supply the necessary heat to this oven to bake or carbonize the material passing therethrough. Suitable valves are provided for controlling the passage of the heating gases through these lines.

It will be observed that the steam from the boiler 5 first passes to the steam compressor cylinder 11. This steam is there utilized to operate a compressor 14 employed for the purpose of subjecting hydrocarbon vapors to a high degree of compression to crack said vapors. The steam exhausting from the power compressor cylinder 11 then passes to the amalgamator. In the process described crude oil, or other charging stock, is fed from a tank 15 passing therefrom through a line 16 from where a portion of the oil can pass through a line 17 to the jacket 18 of the vapor compressing cylinder to control the temperature of compression in said cylinder within an optimum cracking range while the major part of the oil supply passes through the line 19 to a space 20 in the elongated heat exchanger 21. That part of the oil passing through the jacket of the vapor compressing cylinder becomes somewhat preheated therein and is led therefrom through the line 22 to the line 19 and then to the space 20. In the space 20 of the heat exchanger there are a plurality of tubes 23 receiving the compressed vapors, by means of which the heat of the cracked vapors is indirectly imparted to the charging stock in a manner now to be described.

A substantial part of the liquid charging stock entering the space 20 is vaporized, the vapors passing from this space through the line 25 to the compressor 14 where said vapors are subjected to an exceedingly high stage of compression, this compression raising the temperature of the vapors to a cracking condition of temperature and pressure so that they undergo substantial conversion in said compressor. When a cracking temperature has been reached the vapors may be compressed still further while maintaining the temperature substantially constant by circulation of the charging stock through the compressor jacket 18 as above indicated, thus carrying on the cracking under conditions of isothermic compression. The cracked vapors from the compressor while at a cracking temperature, discharge through the line 27 into the tubes 23 passing through the interior of the heat exchanger. These hot vapors serve to vaporize substantial portions of the incoming charging stock to provide the vapors that are to enter the compressor 14.

The cracked vapors by being robbed of their heat largely condense in the tubes 23 and the condensate flows out through the line 28 into the receiver 29 employed for collecting the converted products. The space 20 of the heat interchanger is preferably maintained under a vacuum so as to lower the vaporizing point of the incoming charging stock. The unvaporized oil from this chamber consisting of large quantities of heavy oils, tar, pitch, carbon, etc., is continuously withdrawn through the line 30 and collected in a receiver 31 from where it is conveyed by the line 32 directly to the amalgamator 1. It will also be understood that the amalgamated product passing through the baking oven 8 is subjected to a temperature of say 550° F., to 1000° F., and that the volatiles contained in both the coal and the oil constituting this amalgamated product are vaporized either in part or to any degree desired depending on temperature, time of treatment and type of solid product wanted, these vapors passing through the line 33 to the line 25 for passage on to the compressor 14 to undergo cracking by reason of the high temperature and pressure they attain due to the high compression of these vapors.

As an illustration of an operation, coal of a bituminous character, preferably of a fineness of 100 meshes per linear inch, is introduced in water suspension to the amalgamator, and there mixed with a liquid hydrocarbon residue containing substantial quantities of carbon base. The quantity of hydrocarbon material used is approximately in the proportion of one part hydrocarbon material to five parts coal by weight. The amalgamated material is deposited on the screen 6 and after being formed into masses of uniform size, is then introduced to the baking oven 8 which is heated by furnace gases passing through the line 13. This oven is maintained at a temperature of say 650° to 700° F., causing a vaporization of the lighter volatiles contained in the oil and the coal, leaving the heavier substances therein which retain a substantially solid state in the carbonized masses discharged from the oven on the receiver adjacent the outlet thereof. The vapors generated in the oven pass on to the vapor line 25 for passage to the converting compressor 14 together with other vapors produced from crude oil and in a manner now to be described. During this operation crude oil from the tank 15 is passing through the space 20 of the heat interchanger and this oil is heated therein to a temperature of say 500° F. to 600°F. When a plant is being placed in operation, the oil may be heated by steam from the boiler passing through the tubes 23. After the plant is in operation the oil is then heated by heat absorbed from cracked vapors. A substantial part of this oil, however, is vaporized and these vapors of a temperature of say 500° F to 600° F. pass through the line 25 into the compressor 14 where they are subjected to a high degree of compression of say 100 pounds per square inch, which raises the temperature of the vapors to approximately from 700° to 850° F., this temperature being controlled by the passage of oil through the jacket 18 of the compressor. The compressor is operated by the compressor cylinder 11 receiving steam from the line 10 which communicates with the boiler 5. After the vapors are heated to a cracking temperature in the compressor 14 they then pass through the line 27 into the tubes 23 of the heat exchanger 21. Here the vapors heat the charging stock and are themselves largely condensed, constituting a pressure distillate consisting largely of converted low boiling point oils. Such oils flow through the line 28 into the receiver 29, from which any uncondensed vapors and fixed gases are permitted to escape through the gas outlet pipe 34. The unvaporized oil in the chamber 20 is withdrawn through the residual line 30 by a pump, or the like, depositing into the tank 31 from where it is continuously introduced to the amalgamator 1 for the purposes hereinbefore described.

The pressure distillate may then be fractionated in any suitable manner to extract the motor fuel fraction, and if desired, other commercially usable fractions. The remaining fractions are then added to the residuum from the heat exchanger or to the original charging stock to undergo the treatment cycle a second time. As illustrative of a method of separating the motor fuel from the heavier fractions of the pressure distillate, the pressure distillate may be led from the receiver 29 through the line 35 to a conventional shell still 36 and subjected to fractional distillation, the motor fuel fraction, and if desired, other light fractions, being vaporized and then recondensed by passing same through the condenser 37. The residual fractions then may be led either through the line 38 to the receiver 31 and mixed with the residuum from the vaporization of the charging stock, or led through the line 39 to the tank 15 and mixed with fresh charging stock therein for recycling, revaporizing and recracking.

From the foregoing description of the process, it will be seen that I produce solid, clean, smokeless fuels and liquid motor fuels, that the manufacture of the solid fuel contributes to the yield of liquid fuel, that the production of motor fuel contributes a liquid residuum necessary to the successful manufacture of the solid fuel, that waste or by-product heat incidental to the production of each product is successfully utilized in the production of the other.

Having thus described my invention, what I claim is:

1. A process for manufacturing carbonized fuels of a solid nature and converting hydrocarbon oils, comprising developing heat energy by combustion of a fuel at a single source, in utilizing said heat for subjecting hydrocarbon vapors to a heat compression sufficient to crack the same, in employing waste gases for heating the solid fuel to remove volatiles therefrom and produce a carbonized residue.

2. A process for manufacturing solid carbonaceous fuels and converting hydrocarbon oils by heat energy developed at a single source, comprising utilizing a part of the energy for compressing oil vapors to subject said vapors to cracking temperatures and pressures, in mixing hydrocarbon oil with pulverized coal while in water suspension, and in utilizing a portion of the energy for heating said water during the agitation of the materials.

3. A process for manufacturing solid carbonaceous fuels and converting hydrocarbon oils by heat energy developed at a single source, comprising utilizing a part of the energy for compressing oil vapors to subject said vapors to cracking temperatures and pressures, in mixing hydrocarbon oil with pulverized coal while in water suspension, in utilizing a portion of the energy for heating said water during the agitation of the materials, and in also utilizing waste heat of combustion from said single source for removing oils from the agglomerated material producing a carbonized mass.

4. A process for manufacturing solid carbonaceous fuels and converting hydrocarbon oils by heat energy developed at a single source, comprising utilizing a part of the energy for compressing oil vapors to subject said vapors to cracking temperatures and pressures, in mixing hydrocarbon oil with pulverized coal while in water suspension, in utilizing a portion of the energy for heating said water during the agitation of the materials, in also utilizing waste heat of combustion from said single source for removing oils from the agglomerated material producing a carbonized mass, and in subjecting said removed oils in the form of vapor to said cracking conditions of temperature and pressure.

5. A system of treating hydrocarbon materials, comprising generating heat at a single source by the combustion of fuel, in utilizing a portion of the heat to convert hydrocarbon oils by subjecting oil vapors to cracking conditions of temperature and pressure in a compressor utilizing said energy, in passing said vapors through a preheater to vaporize charging stock being admitted to the compressor, in withdrawing unvaporized oil from said preheater, in introducing said oil to an amalgamator, in mixing said oil in the amalgamator with coal in water suspension, in utilizing a part of said heat produced at a single source for heating the water in said amalgamator, in discharging the agglomerates from said amalgamator, in distilling said agglomerates by heated gases generated at said single source, and in introducing the vapors and gases obtained from said agglomerates to said compressor for conversion.

6. A process for amalgamating coals and cracking hydrocarbon oils, comprising mixing hydrocarbon residue with finely pulverized coal and water, in introducing charging stock to a heat interchanger where a portion thereof is vaporized, in subjecting said vapors to a high compression by a heat energy-operated compressor engine, in passing the compressed vapors through the heat interchanger to vaporize portions of the charging stock, in collecting the low boiling point oils thus produced, in withdrawing residual oil from said heat interchanger and utilizing the same for agglomeration with the coal, and in maintaining the water during such agglomeration in a heated condition by waste heat from said compressor engine.

7. A process for amalgamating coals and cracking hydrocarbon oils, comprising mixing hydrocarbon residue with finely pulverized coal and water, in introducing charging stock to a heat interchanger where a portion thereof is vaporized, in subjecting said vapors to a high compression by a heat energy-operated compressor engine, in passing the compressed vapors through the heat interchanger to vaporize portions of the charging stock, in collecting the low boiling point oils thus produced, in withdrawing residual oil from said heat interchanger and utilizing the same for agglomeration with the coal, in maintaining the water during such agglomeration in a heated condition by waste heat from said compressor engine, in passing the agglomerates to an oven, in vaporizing oil fractions from said agglomerates in said oven, and in passing said fractions to said compressor for conversion therein.

8. A method for the production of motor fuel and baked solid fuel which comprises partially distilling heavy hydrocarbon oil in a manner to form an overhead product and a liquid residue, cracking said overhead product in a manner to produce motor fuel and fractions heavier than motor fuel, separating the motor fuel from the heavier fractions, adding said heavier fractions to said liquid residue, mixing solid carbonizable material with the mixture resulting from the addition of said heavier fractions to said liquid residue thereby forming a solid-liquid mixture, baking said solid-liquid mixture and removing volatile fractions therefrom, and combining said volatile fractions with said overhead product to be cracked therewith.

9. A method for the production of motor fuel and baked solid fuel which comprises partially distilling heavy hydrocarbon oil in a manner to form an overhead product and a liquid residue, cracking said overhead product in a manner to produce motor fuel and fractions heavier than motor fuel, separating the motor fuel from the heavier fractions, adding said heavier fractions to said liquid residue, amalgamating finely divided solid carbonizable material in the presence of water with the mixture resulting from the addition of said heavier fractions to said liquid residue, separating the resultant amalgam from the water, baking said amalgam and removing volatile fractions therefrom, and combining said volatile fractions with said overhead product to be cracked therewith.

10. A method for the production of motor fuel and baked solid fuel which comprises partially distilling heavy hydrocarbon oil thereby forming vaporized fractions and a liquid residue, cracking said fractions in the vapor phase to produce motor fuel and fractions heavier than motor fuel, separating the motor fuel from the heavier fractions, adding said heavier fractions to said liquid residue, mixing solid carbonizable material with the mixture resulting from the addition of said heavier fractions to said residue thereby forming a solid-liquid mixture, baking said solid-liquid mixture thereby forming baked solid fuel and vapors, and combining said vapors with said vaporized fractions to be vapor phase cracked therewith.

11. A method for the production of motor fuel and baked solid fuel which comprises partially distilling heavy hydrocarbon oil thereby forming vaporized fractions and a liquid residue, cracking said fractions in the vapor phase to produce motor fuel and fractions heavier than motor fuel, separating the motor fuel from the heavier fractions, adding said heavier fractions to said liquid residue, amalgamating finely divided solid carbonizable material in the presence of water with the mixture resulting from the addition of said heavier fractions to said liquid residue, separating the resultant amalgam from the water, baking said amalgam thereby forming baked solid fuel and vapors, and combining said vapors with said vaporized fractions to be vapor phase cracked therewith.

12. A method for producing motor fuel and baked solid fuel which comprises cracking hydrocarbon oil heavier than gasoline in a manner to form motor fuel hydrocarbons and hydrocarbons heavier than motor fuel, separating the motor fuel hydrocarbons from the heavier hydrocarbons, mixing solid carbonizable material with said heavier hydrocarbons and baking the resultant mixture, removing vaporized hydrocarbon fractions from the baking operation, and combining said fractions with additional hydrocarbon oil and cracking the mixture thereby formed.

13. A method for producing motor fuel and baked solid fuel which comprises cracking hydrocarbon oil heavier than gasoline in a manner to form motor fuel hydrocarbons and hydrocarbons heavier than motor fuel, separating the motor fuel hydrocarbons from the heavier hydrocarbons, amalgamating finely divided solid carbonizable material with said heavier hydrocarbons in the presence of water, and separating the resultant amalgam from the water, baking said amalgam and removing vaporized hydrocarbon fractions from the baking operation, and combining said fractions with additional hydrocarbon oil and cracking the mixture thereby formed.

14. A method for producing motor fuel and baked solid fuel which comprises partially distilling heavy hydrocarbon oil to form an overhead product and a liquid residue, mixing solid carbonizable material with said liquid residue and baking the resultant mixture, removing vaporized hydrocarbon fractions from the baking operation, combining said fractions with said overhead product, and cracking the mixture of said fractions and overhead product in a manner to produce motor fuel hydrocarbons therefrom.

15. A method for the production of motor fuel and baked solid fuel which comprises partially distilling heavy hydrocarbon oil thereby forming vapors and liquid residue, mixing solid carbonizable material with said liquid residue and baking the resultant mixture, removing hydrocarbon vapors from the baking operation and combining the same with the first mentioned vapors, and cracking the resultant vapor mixture in the vapor phase in a manner to produce motor fuel hydrocarbons therefrom.

16. A method for producing motor fuel and baked solid fuel which comprises partially distilling heavy hydrocarbon oil to form an overhead product and a liquid residue, amalgamating finely divided solid carbonizable material with said liquid residue in the presence of water and separating the resultant amalgam from the water, baking said amalgam and removing vaporized hydrocarbon fractions from the baking operation, combining said fractions with said overhead product, and cracking the mixture of said fractions and overhead product in a manner to produce motor fuel hydrocarbons therefrom.

17. A method for the production of motor fuel and baked solid fuel which comprises partially distilling heavy hydrocarbon oil thereby forming vapors and liquid residue, amalgamating finely divided solid carbonizable material with said residue in the presence of water and separating the resultant amalgam from the water, baking said amalgam, removing hydrocarbon vapors from the baking operation and combining the same with the first mentioned vapors, and cracking the resultant vapor mixture in the vapor phase in a manner to produce motor fuel hydrocarbons therefrom.

18. A method for producing motor fuel and baked solid fuel which comprises mixing solid carbonizable material with hydrocarbon oil heavier than gasoline, baking the resultant mixture and removing vaporized hydrocarbons from the baking operation, cracking said hydrocarbons in a manner to produce motor fuel hydrocarbons and fractions heavier than motor fuel, separating the motor fuel hydrocarbons from the heavier fractions, mixing said heavier fractions with additional quantities of solid carbonizable material and baking the resultant mixture.

19. A method for producing motor fuel and baked solid fuel which comprises amalgamating finely divided solid carbonizable material with hydrocarbon oil heavier than gasoline in the presence of water, separating the resultant amalgam from the water, baking said amalgam and removing vaporized hydrocarbons from the baking operation, cracking said hydrocarbons in a manner to produce motor fuel hydrocarbons and fractions heavier than motor fuel, separating the motor fuel hydrocarbons from the heavier fractions, and utilizing said heavier fractions in the amalgamation of additional quantities of solid carbonizable material to be processed as aforesaid.

20. A method for the production of motor fuel and baked solid fuel which comprises partially distilling heavy hydrocarbon oil in a manner to form an overhead product and a liquid residue, cracking said overhead product in a manner to produce motor fuel and fractions heavier than motor fuel, separating the motor fuel from the heavier fractions, adding said heavier fractions to said liquid residue, mixing solid carbonizable material with the mixture resulting from the addition of said heavier fractions to said liquid residue thereby forming a solid-liquid mixture, and baking said solid-liquid mixture.

In testimony whereof, I have signed my name to this specification.

WALTER EDWIN TRENT.